UNITED STATES PATENT OFFICE.

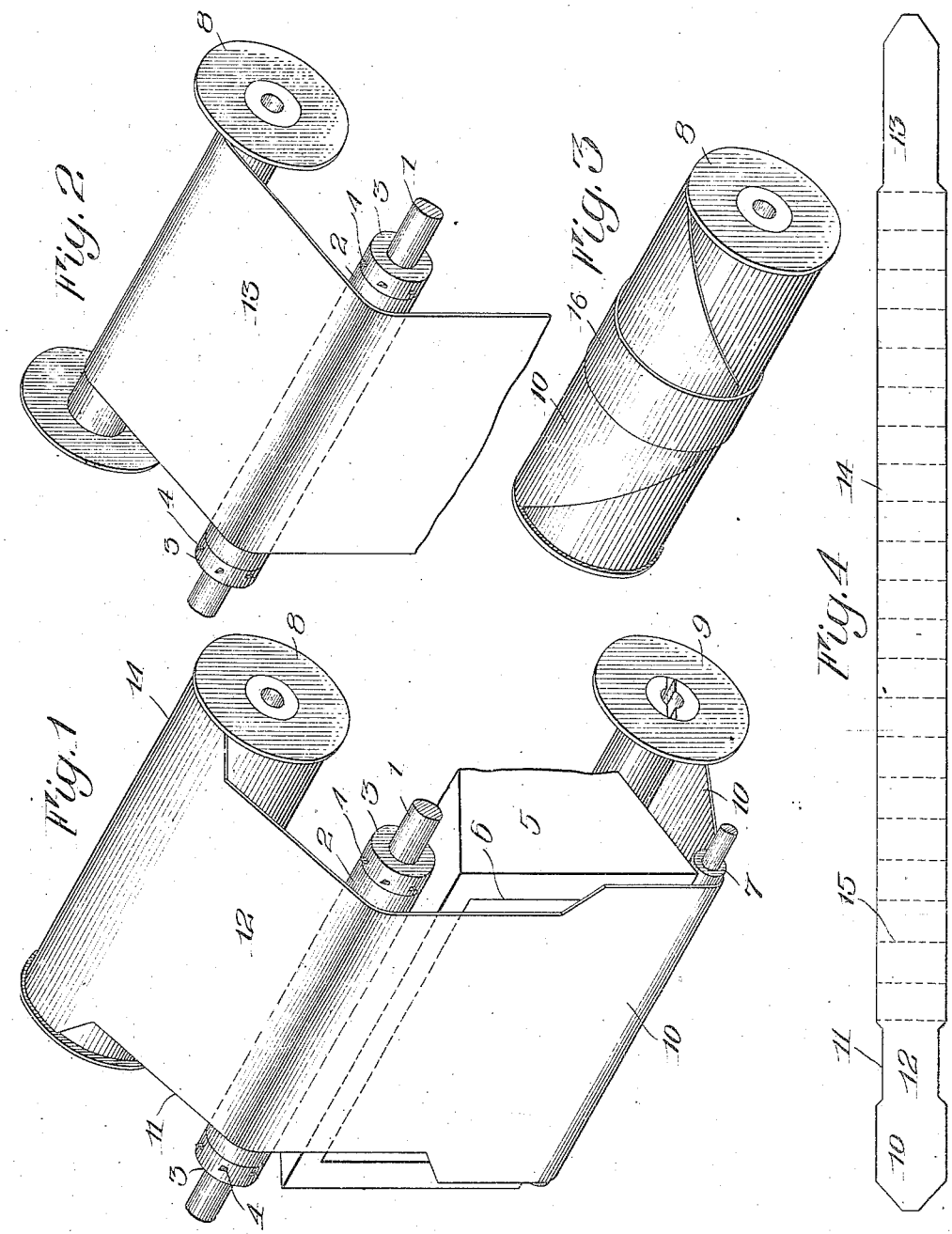

WILLIAM F. FOLMER, OF ROCHESTER, NEW YORK, ASSIGNOR TO EASTMAN KODAK COMPANY, OF ROCHESTER, NEW YORK, A CORPORATION OF NEW YORK.

PHOTOGRAPHIC-FILM STRIP.

1,260,357.      Specification of Letters Patent.      Patented Mar. 26, 1918.

Application filed November 13, 1915. Serial No. 61,268.

*To all whom it may concern:*

Be it known that I, WILLIAM F. FOLMER, of Rochester, in the county of Monroe and State of New York, have invented certain new and useful Improvements in Photographic-Film Strips; and I do hereby declare the following to be a full, clear, and exact description of the same, reference being had to the accompanying drawings, forming a part of this specification, and to the reference-numerals marked thereon.

My present invention relates to photography and more particularly to flexible photographic films such as are formed into strips and wound upon a spool forming a film cartridge for roll holding cameras and the invention has for its object to provide a film strip so constituted that when used in an exposing mechanism in which the shutter devices or the film winding devices or both, are placed under the control of the film, the latter will not exercise its control falsely and automatically provide for conditions that do not exist. To these and other ends the invention resides in certain improvements and combinations of parts all as will be hereinafter more fully described, the novel features being pointed out in the claims at the end of the specification.

In the drawings:

Figure 1 is a perspective view of certain parts of a camera mechanism upon which is disposed a photographic film strip constructed in accordance with and illustrating one embodiment of my invention, the latter being in a preliminary position occupied before it has taken a position to receive an exposure;

Fig. 2 is a similar fragmentary view showing the disposition of the rear end of the strip after the last exposure has been made;

Fig. 3 is a perspective view of the roll or cartridge, and

Fig. 4 is a plan view of the film strip.

Similar reference numerals throughout the several figures indicate the same parts.

This invention contemplates an improved film for use in any exposing mechanism where the progress of the strip in unwinding performs some function whereby a condition within the camera is indicated or a desired effect upon some mechanism is automatically produced, but for convenience in the following description, I will select a mechanism in which it will be assumed that the object to be gained is to place a shutter mechanism and a film winding mechanism under the control of the film so that after an exposure, the shutter mechanism may not again be operated to reëxpose the same surface on the film because locked until the winding mechanism has been operated to spread a new surface before the lens and so that after such fresh surface has been brought into exposing position, it may not be withdrawn from that position before the shutter mechanism is operated to expose it because of the winding mechanism being locked pending such operation of the shutter mechanism. In this view, referring to the drawings, 1 indicates a shaft that is suitably connected to the winding and shutter mechanisms and which carries an idle roller 2 rotatable freely thereon. At each end of said roller 2 is a collar 3 of the same diameter and forming a continuation thereof but which is fixed to the shaft 1 and carries a number of circumferentially arranged film engaging spurs 4. There is thus produced a film measuring roll the central portion of which is idle and the ends of which are adapted to positively engage the margins of a film strip of proper width when drawn across it.

The measuring roll is shown adjacent to a frame 5, the opening 6 at the rear of which is in the focal plane and constitutes the exposure opening, defining the field of the image cast by the lens and across which the film is drawn in the focal plane with the aid of a guide roll 7 at the bottom. The spool upon which the film strip is wound before exposure is shown at 8 and the winding spool on which it is drawn off is shown at 9.

The film strip itself is best illustrated in Fig. 4 and in the present instance is constituted by an actinically opaque backing of black paper or other suitable material to the front or inner face of which is directly applied the emulsion or sensitive medium. The forward end 10 is of a width sufficient to fit closely to both flanges of the spool 8 when initially wound thereon, as shown in Fig. 3, and form an outer protective light-tight covering for the unexposed roll or cartridge and be secured by the usual band or label 16. Next to this front portion 10 the margins of the strip are cut away for a distance, as at 11, to provide a narrower portion 12 which is capable of traveling upon the idle roller 2 without engaging the fixedly connected spurs 4. At the extreme rear end there is a similar narrow portion 13 that constitutes the inner terminal of the strip wound next to the core of the spool 8. The intermediate portion or body of the strip 14 is of the maximum width of the portion 10 and adapted to be engaged by the spurs 4 and it is on this portion that the successive exposures are made on different picture areas indicated by the dotted lines 15.

The operation is as follows:

The primary object of the two-part roll 2—3 is to measure the film after it leaves the supply spool 8 and just before it passes before the exposure opening 6 so that when a sufficient area has been drawn off to cover the latter, further winding of the take-up spool 9 will be stopped until after the exposure. This, as before stated, is effected through suitable connections with the shaft 1. In Fig. 1, the front end portion 10 has been threaded upon the take-up spool 9 and the part of the strip in front of the exposure opening 6 is made up of a portion of this end 10 and a part of the reduced portion 12 which latter is also exposed against the measuring roll. Neither of these portions 10 and 12 is a picture carrying surface and hence it is desired that the device be not locked until both have passed on. Hence, the strip passes idly for a time over the free roller 2, only, allowing continued rotation of the spool 9 beyond that required to advance a single picture length. When, however, the intermediate picture carrying portion 14 emerges from the spool 8 far enough to engage the spurs 4, the measuring commences and the winding is stopped as soon as the first picture length thereon has passed the roll and spanned the exposure opening. The proper positioning of the very first picture carrying area is therefore assured and indicated, no useless operation of the shutter upon the inoperative part of the strip being permitted and this is the function of the narrow portion 12.

After the last exposure area on the intermediate portion 14 has been exposed and winding of the spool 9 is proceeded with, the latter will not thereafter again be locked for the reason that the narrow portion 13 at the extreme inner end of the strip then passes to the measuring roll and but idly engages the free roller 2, as shown in Fig. 2, until the whole strip has been completely rewound upon the spool 9. There can therefore be no useless operation of the shutter upon this end either for it cannot be released until the shaft 1 is turned while the limitless rotation of the winding spool indicates that the strip has been completely utilized and this is the function of the reduced portion 13.

Of course, the shaft 1 could be connected to an exposure indicator or automatic mechanism other than those suggested herein without departing from the spirit of my invention which has to do essentially with the formation of a film strip in such manner that it will but intermittently affect a coöperating factor in a controlling mechanism of some kind.

It is also obvious that my invention is not limited to a unitary film strip of the exact character described as the film base or carrying medium may be separate from the protective backing strip and the required formation given to one or both of these parts.

I claim as my invention:

1. A photographic film roll composed of a continuous strip having its rear end of a uniform width and narrower than its intermediate portion.

2. A photographic film roll composed of a continuous strip having a portion near its front end of a uniform width and narrower than its intermediate portion.

3. A photographic film roll composed of a continuous strip having a portion near its front and a portion near its rear end each of a uniform width narrower than its intermediate portion.

4. A photographic film consisting of an opaque flexible strip coated with sensitive material and embodying a portion near each end narrower than the intermediate portion, the said narrower portions having parallel edges and being of equal width and in alinement with each other longitudinally of the strip.

5. A photographic film strip having a broad protective outer end portion and a broad intermediate, sensitive portion adjoined by narrower portions of uniform width.

WILLIAM F. FOLMER.

Witnesses:
RUSSELL B. GRIFFITH,
AGNES NESBITT BISSELL.